US012696888B2

(12) United States Patent　　　(10) Patent No.:　US 12,696,888 B2
Tushar et al.　　　　　　　　　　(45) Date of Patent:　　Aug. 4, 2026

(54) SLIP BOBBER

(71) Applicant: Lake Lite Innovations, LLC, Neenah, WI (US)

(72) Inventors: Mark W. Tushar, Neenah, WI (US); Kenneth R. Mack, Neenah, WI (US)

(73) Assignee: Lake Lite Innovations, LLC, Neenah, WI (US)

(\*) Notice: Subject to any disclaimer, the term of this patent is extended or adjusted under 35 U.S.C. 154(b) by 0 days.

(21) Appl. No.: 18/539,979

(22) Filed: Dec. 14, 2023

(65) Prior Publication Data

US 2024/0196877 A1　　Jun. 20, 2024

Related U.S. Application Data

(60) Provisional application No. 63/433,286, filed on Dec. 16, 2022.

(51) Int. Cl.
A01K 93/02　　　　(2006.01)

(52) U.S. Cl.
CPC .................................... A01K 93/02 (2013.01)

(58) Field of Classification Search
CPC ...................................................... A01K 9/02
USPC ........................ 43/44.9, 44.87, 43.43, 31, 17
See application file for complete search history.

(56) References Cited

U.S. PATENT DOCUMENTS

| | | | | |
|---|---|---|---|---|
| 1,193,912 A | * | 8/1916 | Maire .................... | A01K 93/00 43/43.15 |
| 2,483,788 A | * | 10/1949 | Robinson ............... | A01K 93/00 43/44.9 |
| 2,526,031 A | * | 10/1950 | Kocarek ................ | A01K 97/24 43/44.9 |
| 2,547,308 A | * | 4/1951 | Dean ..................... | A01K 93/00 43/44.87 |
| 2,741,864 A | * | 4/1956 | Shotton .................. | A01K 93/00 43/42.31 |
| 2,872,752 A | * | 2/1959 | Salzmann .............. | A01K 93/00 43/44.9 |
| 3,323,247 A | * | 6/1967 | Murray .................. | A01K 93/00 43/44.87 |
| 3,392,475 A | * | 7/1968 | Vakousky, Jr. ........ | A01K 75/04 43/44.9 |
| 3,760,527 A | * | 9/1973 | Hamren ................. | A01K 93/00 43/44.88 |

(Continued)

*Primary Examiner* — Zoe Tam Tran
(74) *Attorney, Agent, or Firm* — Quarles & Brady LLP

(57)　　　　　　ABSTRACT

A slip bobber includes a bobber body extending along a central longitudinal axis. The bobber body includes a forward-bottom portion and a rear-top portion. A full-length channel for accommodating the reception of a fishing line therethrough runs axially through the bobber body from a forward-bottom line opening to a rear-top line opening. A weight ballast is located between the line openings that results in a center of gravity of the bobber body being closer to the forward-bottom line opening than the rear-top line opening. Upon casting, the weight ballast causes the forward-bottom portion of the bobber body to lead and the rear-top portion to trail. Upon reception in water, the weight ballast is situated such that the bobber body floats horizontally in the water in a rest position with the central longitudinal axis being substantially parallel to a surface of the water in which the slip bobber is received.

20 Claims, 2 Drawing Sheets

(56)                    References Cited

U.S. PATENT DOCUMENTS

| | | | | |
|---|---|---|---|---|
| 3,832,795 | A * | 9/1974 | Wolfe | A01K 93/00 |
| | | | | 43/17 |
| 4,727,676 | A * | 3/1988 | Runyan | A01K 85/00 |
| | | | | 43/43.12 |
| 4,845,885 | A * | 7/1989 | Rubbelke | A01K 93/00 |
| | | | | 43/44.87 |
| 5,351,432 | A * | 10/1994 | Tse | A01K 93/02 |
| | | | | 43/17 |
| 5,784,829 | A * | 7/1998 | Latta | A01K 93/00 |
| | | | | 43/44.87 |
| 6,138,398 | A * | 10/2000 | Livingston | A01K 93/02 |
| | | | | 43/17 |
| 6,389,736 | B1 * | 5/2002 | Frost | A01K 93/00 |
| | | | | 43/44.87 |
| 8,505,232 | B2 * | 8/2013 | Reynolds | A01K 93/00 |
| | | | | 43/44.9 |
| 9,055,736 | B1 * | 6/2015 | DeLucca | A01K 93/02 |
| 2007/0227058 | A1 * | 10/2007 | Adams | A01K 93/02 |
| | | | | 43/44.9 |
| 2007/0294934 | A1 * | 12/2007 | Myers | A01K 93/00 |
| | | | | 43/41 |
| 2010/0281757 | A1 * | 11/2010 | Bennis | A01K 93/00 |
| | | | | 43/44.9 |
| 2012/0180375 | A1 * | 7/2012 | Kavanaugh | A01K 93/00 |
| | | | | 43/44.9 |
| 2018/0055028 | A1 * | 3/2018 | Hsieh | G01P 1/023 |

* cited by examiner

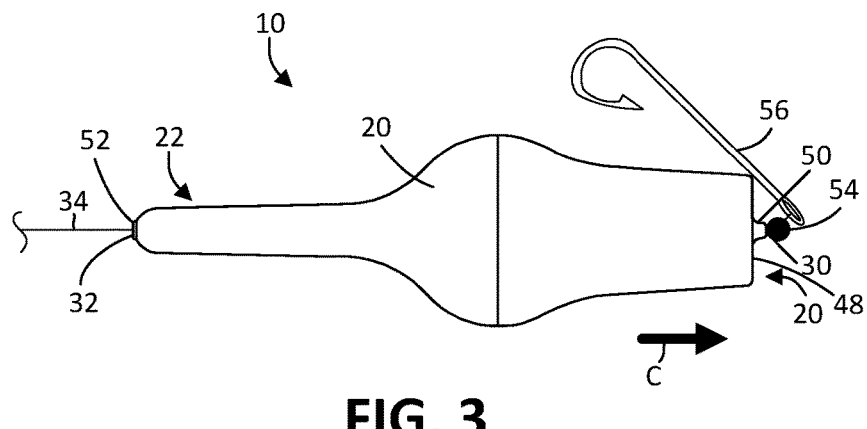
FIG. 3
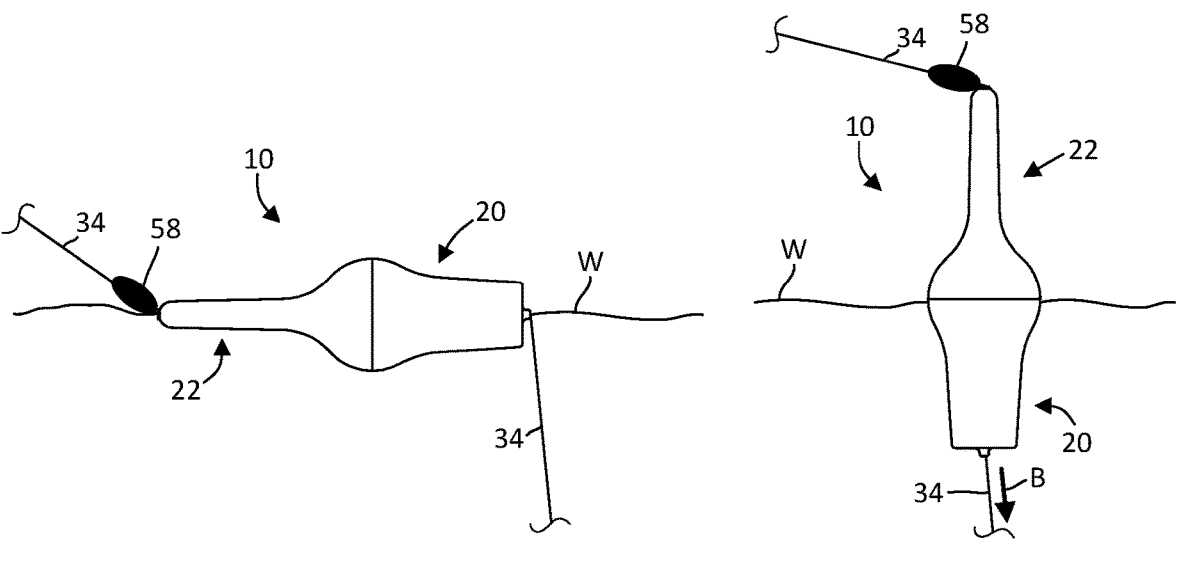
FIG. 4
FIG. 5

SLIP BOBBER

CROSS REFERENCE TO RELATED APPLICATIONS

This application claims the benefit of U.S. Provisional Patent Application No. 63/433,286 filed Dec. 16, 2022, the contents of which are incorporated by reference in its entirety as if set forth herein.

FIELD OF DISCLOSURE

This disclosure relates to fish strike indicators and more particularly to fishing bobbers.

BACKGROUND

Fishing bobbers of many descriptions from simple dry twigs to elaborate multi-purpose designs are known in the prior art. The simplest manufactured bobbers are spheroid or ellipsoid models made of cork or foam with some simple means to hold the bobber to the line. A representative bobber of this types is recited in U.S. Pat. No. 668,254 issued on Feb. 19, 1901. However, these simple bobbers suffer from two common deficiencies: they are too lightweight to be cast any distance and they usually indicate a fish strike only when pulled completely underwater by the fish, hence a fish feels resistance equal to the total amount of water displaced by the submerged bobber. This can be detrimental to fish of small size commonly sought by many anglers as table fare. The artificial feel of the bait or lure may also cause these fish to turn from the hook.

A second class of bobbers is those of elongate design, commonly known as stick bobbers or pencil bobbers. An example of such a stick or pencil bobber is described in U.S. Pat. No. 5,412,902 issued May 9, 1995. Stick or pencil bobbers suffer from the same deficiencies as round or oval bobbers in that their lack of weight limits casting distance and their need to submerge a relatively large highly buoyant body before the strike is indicated.

A third type of bobber uses a metal additive generally in the form of lead as weight to promote casting distance. An example is U.S. Pat. No. 4,845,885, issued Jul. 11, 1989. This bobber has a metal washer internal to its body and, being a dissimilar material, involves a step in the manufacturing process that can be eliminated through the use of similar materials as the weight additive.

SUMMARY

A need remains for a simply constructed fishing bobber that is capable of being cast a great distance and that is also operable as a slip bobber. A slip bobber is a bobber in which the bobber is capable of traveling along a predetermined portion of the fishing line to set a depth of the bait. This would permit for a highly compact rig to be cast out a great distance, while also allowing the bait, once cast, to sink to the appropriate depth by virtue of the use of the slip bobber.

Some aerodynamic slip bobbers exist, such as the Rocket Bobber by Tackle 2000 Inc. of Neenah, WI, in which one end of the bobber is attached to the fishing line with a spring-loaded J-hook mechanism in which the J-hook mechanism on one axial end of the bobber can temporarily be opened to receive the fishing line and then the J-hook mechanism biased shut to capture the line. With a bobber stop on the line on one side of the attachment point at the J-hook mechanism on the bobber and with the hook and sinker weight on the line on the other side of the attachment point of the bobber, this can permit the bobber at the attachment point of the J-hook mechanism to travel or "slip" along the line between the stop and the sinker weight.

While this permits the functionality of the bobber as a slip bobber, the movement of the bobber along the line at the J-hook mechanism can also create problems during casting. For example, because the fishing line runs through the J-hook mechanism at an axial end of the bobber, it is possible for the fishing line on either side of the J-hook mechanism to get tangled with the other side of the fishing line. Particularly, as one end of the line includes a hook thereon, the sides of the line can become tangled or connected together during casting and, when the bobber lands on the surface of the water, the hook, bait, and sinker then may not deploy correctly (or at all) because the hook and sinker have become tangled around the depth-establishing side of the line.

Disclosed herein is an improved aerodynamic slip bobber that avoids the aforementioned deficiencies of aerodynamic bobbers that utilize a J-hook mechanism at an axial end thereof to permit the bobber to be used as a slip bobber. The newly disclosed slip bobber includes both (1) a tube or channel running the axial length of the slip bobber for receiving the fishing line therethrough and that separates the line ends from one another to avoiding tangling while (2) still offering a weighting or internal ballast that creates a "forward" end that then predicably leads during casting to assist in achieving a long cast distance. The channel provides the structure for the bobber to act as a slip bobber for deploying the hook and bait to a pre-established depth after casting. The tube and the presence of a base wall can help push the bait forward during casting in a way that also reduces the possibility of line tangle in comparison to a J-hook mechanism. In addition to this, the disclosed structure offers bobber design that, after being cast and the bait deployed, goes from horizontal at rest to vertical at bite orientation for improved visibility when a bite occurs. Further still, in some forms, the construction of the bobber can include an internal chamber that creates sound and vibration to attract fish when the rod is slightly lifted up and the line is pulled against the deployment depth. The bobber can also incorporate an integrally formed unitary grommet design at the ends of the channel that can reduce the number of components and time needed to assemble the bobber. These and various other possible benefits from the improved bobber will be understood and can be gleaned from the description that follows.

According to one aspect, a slip bobber is disclosed that includes a bobber body extending along a central longitudinal axis. This bobber body includes a forward-bottom portion and a rear-top portion. The bobber body includes a forward-bottom line opening at a forward-bottom axial end of the forward-bottom portion and further includes a rear-top line opening at a rear-top axial end of the rear-top portion. A full-length channel runs from the forward-bottom line opening to the rear-top line opening and extends axially through the bobber body along the central longitudinal axis. This full-length channel is for accommodating the reception of a fishing line through the channel such that the structure is able to perform the function as acting as a slip bobber. The bobber body has a weight ballast located between the forward-bottom line opening and rear-top line opening that results in a center of gravity of the bobber body being closer to the forward-bottom line opening than the rear-top line opening. Upon casting, the weight ballast causes the forward-bottom portion of the bobber body to lead and the rear-top portion to trail while the slip bobber is in the air during the cast. Upon reception in water, the weight ballast of the bobber body (and possibly an internal cavity in the body) is so situated such that the bobber body lies horizontal in the water in a rest position with the central longitudinal axis being substantially parallel to a surface of the water in which the slip bobber is received.

In some forms, upon reception in the water and upon a downward force being applied at the forward-bottom line opening (such as by a fishing line being pulled downward by a fish bite on the line), the weight ballast is so situated as to cause or to permit the forward-bottom portion of the bobber body to tip down into the water further and the rear-top portion of the bobber body to tip up out of the water such that the slip bobber assumes a bite indication position. In the bite indication position of the slip bobber, the central longitudinal axis of the of the bobber body may be substantially perpendicular to a surface of the water. This may reduce the amount of resistance that the fish feels when biting on the line while also providing a strike indicator that does not completely submerge during a bite, In some forms, the forward-bottom portion and the rear-top portion may be separately formed parts of the bobber body that are joined together. For example, the forward-bottom portion may include the forward-bottom axial end and a first central end in which the forward-bottom portion includes a forward-bottom channel section, and the rear-top portion may include the rear-top axial end and a second central end in which the rear-top portion includes a rear-top channel section. The first central end of the forward-bottom portion can be joined to the second central end of the rearward-top portion, thereby aligning and connecting the forward-bottom channel section and the rear-top channel section to provide the full-length channel section that extends along the central longitudinal axis. In such a multi-part design, the forward-bottom portion is heavier than the rear-top portion and/or the forward-bottom portion may have a higher density than the rear-top portion. This, along with geometric shape profiles of the portions can help to define a careful balance in which, on one hand, there is a heavier end of the slip bobber that will lead when the bobber is attached a line and cast, and on another hand, the weight distribution, bobber shape geometry, and forces are such that the bobber will tend to initially lie horizontal in the water after casting due to buoyancy (until a bite occurs at which point the bobber will take a more vertical orientation under the applied downward force on the line on the forward-bottom axial end of the fishing line).

In some forms employing such a multi-part design, the forward-bottom portion and the rear-top portion may be joined together, for example, by at least one of sonic welding, spin welding, and gluing. There could also be a threaded connection and seals, especially when there is an internal cavity that should remain filled with gas or air for buoyancy.

Similarly, in some forms employing such a multi-part design, the slip bobber may further include an internal cavity formed in a volume between the first central end of the forward-bottom portion and the second central end of the rear-top portion. The internal cavity may provide an internal echo sound chamber for attracting fish, particularly when a fisherman lifts a rod tip to lift the hook/bait to contact a base wall of the bobber.

In some forms, the forward-bottom axial end provides a base wall for pushing an attached bait forward during casting and to avoid line tangle.

In some forms, the forward-bottom axial end of the forward-bottom portion and the rear-top axial end of the rear-top portion may have protruding rings unitarily formed about the forward-bottom line opening and the rear-top line opening. These rings may respectively simulate grommets without requiring actual grommets (thereby reducing the number of components) and thereby the number of assembly steps associated with constructing the slip bobber.

In some forms, a length of the slip bobber between the forward-bottom line opening and the rear-top line opening is at least three times as long as a maximum width of the slip bobber in a direction perpendicular to the length. However, in other forms the slip bobber may be two, two and a half, three, or four times as long as wide with the basic idea being that the slip bobber is elongated, can be cast and travel in an aerodynamic manner, can lay horizontal when in the water once received in the water (but before a bite), and then tip upward to a more vertical position once a bite occurs and the line is pulled.

A method of using the slip bobber as recited above and herein is also contemplated. A fishing line is run through the full-length channel of the slip bobber with a free end of the fishing line being inserted into the rear-top line-opening and exiting the forward-bottom line opening. Then, a hook is attached on the free end of the fishing line that has exited the forward bottom line opening. The method can further include attaching a sink weight to the fishing line between the hook and the full-length channel and/or attaching a depth stop to the fishing line for selective engagement with the rear-top line opening on a side of the slip bobber opposite the hook to set a depth of the hook and any associated bait during fishing.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIG. 3 is a side view of the slip bobber in flight during casting, including a hook and sinker bead, with the flight direction through the air indicated by the directional arrow C.

FIG. 4 is a side view of the slip bobber after reception in the water in which the slip bobber is a horizontal position in which a depth of the hook (not shown) is established by the depth stop.

FIG. 5 is a side view of the slip bobber after reception in the water as in FIG. 4, but after a bite has occurred by pulling the line in the direction of directional arrow B, causing the slip bobber to take on a more vertical orientation.

DETAILED DESCRIPTION

Figure 1:
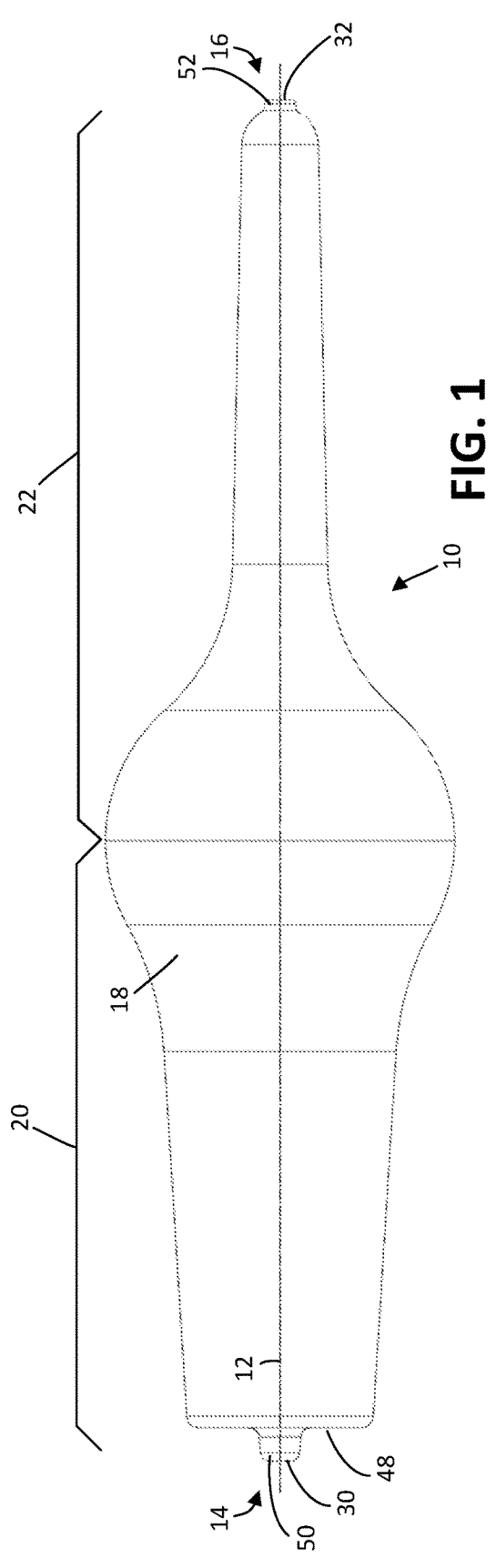
FIG. 1 is a side elevational view of a slip bobber in accordance with an exemplary embodiment.
Figure 2:
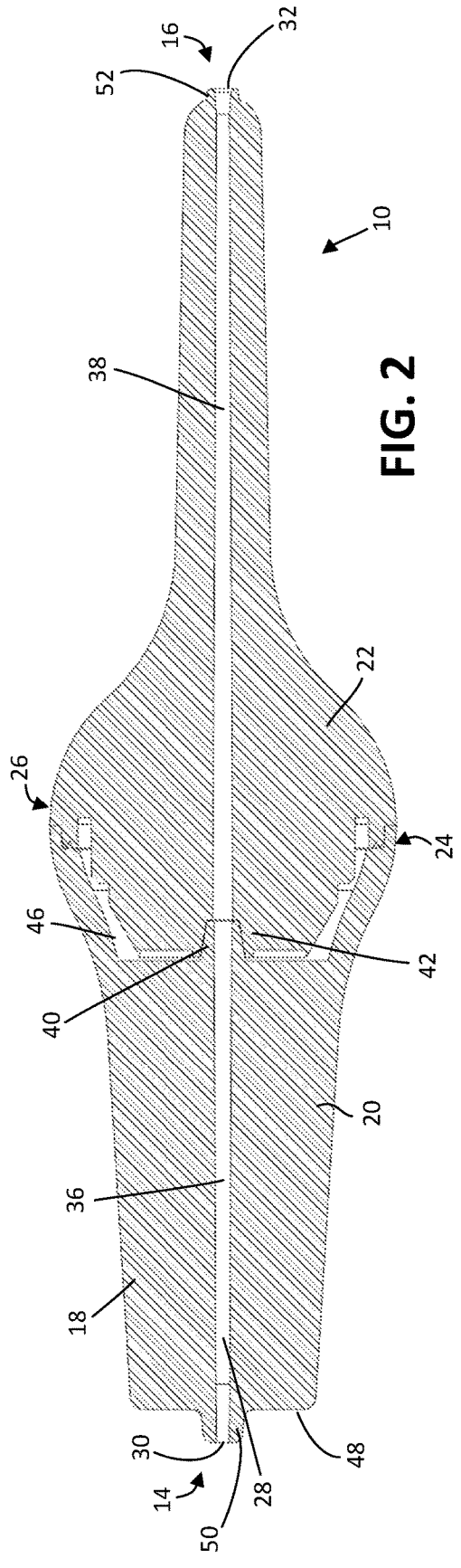
FIG. 2 is a cross-sectional side view of the slip bobber taken through the central longitudinal axis of FIG. 1.

Looking first, at FIGS. 1 and 2, a slip bobber 10 is illustrated apart from any other parts of a fishing line. While a side view of the slip bobber 10 is provided in these figures, this side view is effectively the same when taken from any one of the sides (i.e., the top, bottom, right side, or left side) such that the profile of the slip bobber 10 can be defined by rotating an outer surface profile around a central longitudinal axis 12 extending from a forward-bottom axial end 14 to a rear-top axial end 16. The slip bobber 10 has a bobber body 18 extending along the central longitudinal axis 12 with the bobber body 18 having a forward-bottom portion 20 and a rear-top portion 22.

As will be apparent from the description of use of the bobber 10 that follows, the descriptors "forward-bottom" and "rear-top" are used to simultaneously characterize the sides, portions, or ends of the bobber 10 based on the particular use positions of the bobber 10 at various stages of fishing, specifically first during casting and then during bite indication. During casting such as generally depicted in FIG. 3 with arrow C indicating the direction of travel during casting, the "forward" portion 20 will lead in the direction of travel during the cast while the "rear" portion 22 will trail. This leading/trailing is because the weight distribution or internal ballast provides more weight in the forward portion 20 relative to the rear portion 22 causing the forward portion 20 to lead when cast due to its heavier weight. When received in the water and functioning as a bite indicator as depicted in FIGS. 4 and 5, the internal ballast and internal cavity of the bobber 10 are so positioned that the bobber 10 will lie substantially horizontally before a bite as depicted in FIG. 4, with the central longitudinal axis 14 being substantially parallel to the surface of the water W (this "horizontal" orientation is a general one and not precise, as some amount of water and air movement can cause the bobber 10 to dynamically shift around on the surface of the water W and the bobber 10 will not remain perfectly statically positioned). However, when a bite occurs pulling the line as depicted by arrow B in FIG. 5, in the intended mode of use, the ballast and internal cavity are so positioned such that the bobber 10 will tip to a more vertical orientation with the central longitudinal axis 14 becoming substantially perpendicular to the surface of the water W, with the bottom portion 20 tipping downward into the water under the force from the line by the bite and with the top portion 22 tipping out of the water to provide a visual indication that the bite event has occurred and the line has been pulled. The bottom portion during the bite indication corresponds to and is the same portion as the forward portion during the cast and so this portion is collectively referred to as the forward-bottom portion 20 to simultaneously reflect the intended position or orientation at both operational times. Likewise, the top portion during the bite indication corresponds to and is the same portion as the rear portion during the cast and so this is portion is collectively referred to as the rear-top portion 22 to simultaneously reflect the intended position or orientation at both operational times.

In at least some forms, the forward-bottom portion 20 and the rear-top portion 22 are separately formed parts of the bobber body 18 that are joined together. This two-piece construction is particularly apparent in FIG. 2 which shows the two portions 20 and 22 in cross section. The forward-bottom portion 20 and the rear-top portion 22 might be joined together in various ways including, but not limited to, a threaded connection, sonic welding, spin welding, gluing, and so forth or combinations thereof. In instances in which the bobber 10 is a two-piece construction, the forward-bottom portion 20 may include the forward-bottom axial end 14 and a first central end 24 while the rear-top portion 22 may include the rear-top axial end 16 and a second central end 26. The first central end 24 of the forward-bottom portion 20 may be joined directly to the second central end 26 of the rearward-top portion 22 to link the two pieces together into a unitary form providing the bobber body 18.

To provide that the aforementioned weight ballast or center of gravity that is closer to the forward-bottom axial end 14 than the rear-top axial end 16, the forward-bottom portion 20 can be heavier than the rear-top portion 22. In some embodiments, the forward-bottom portion 20 can be a higher density than the rear-top portion 22. Similarly, to place more weight at the forward-bottom axial end 14, the bobber 10 can be shaped such that the forward-bottom portion 20 has a thicker body in that forward axial region than in the rear axial region. Thus, it can be observed in the various figures that the forward-bottom portion 20 generally has a larger radius and more material than the rear-top portion 22 which has a very narrow tail. As shaped, the bobber body 18 has generally cylindrical section on the forwardmost end that tapers slightly outward as it extends rearwardly and transitions into a central frusto-spherical section, which central frusto-spherical section is closer to the forward-bottom axial end 14 than the rear-top axial end 16. Moving rearward, this central frusto-spherical section then transitions into a generally cylindrically shaped rear tail at the rearmost end of the bobber 10 that tapers slightly smaller the further rearward it goes.

To improve visibility of the bobber 10 both in the horizontal position as depicted in FIG. 4, in which the bobber 10 is at rest and floating in the water, as well as after a bite has occurred as depicted in FIG. 5 in which the bobber 10 has taken on a more vertical orientation, the forward-bottom portion 20 and the rear-top portion 22 may be different colors. For example, one of the forward-bottom portion 20 and the rear-top portion 22 could be yellow and the other orange. These colors (or other colors) could be used and might be particularly bold or bright, such as fluorescent or neon colors, safety orange, or other highly visible colors. Still further, they could be colors that highly contrast one another to make clear the forward-bottom portion 20 from the rear-top portion 22.

To facilitate its use as a slip bobber without a pinching J-hook mechanism for attachment to the line, the slip bobber 10 includes a full-length channel 28. To establish this channel 28 as illustrated, the bobber 10 has a forward-bottom line opening 30 at the forward-bottom axial end 14 of the forward-bottom portion 20 and a rear-top line opening 32 at the rear-top axial end 16 of the rear-top portion 22. The full-length channel 28 runs from the forward-bottom line opening 30 to the rear-top line opening 32 and extends axially through the bobber body 18 along the central longitudinal axis 14. This full-length channel 28 is for accommodating the reception of a fishing line 34 (see, for example FIGS. 3-5) through the channel 28.

In the case of a multi-part construction, such as that illustrated in FIG. 2 specifically, the forward-bottom portion 20 includes a forward-bottom channel section 36 and the rear-top portion 22 includes a rear-top channel section 38. The first central end 24 of the forward-bottom portion 20 is joined to the second central end 26 of the rearward-top portion 22, thereby aligning and connecting the forward-bottom channel section 36 and the rear-top channel section 38 to collectively provide the full-length channel section 28 that extends along the central longitudinal axis 12. Under such construction, one of the portions may include a projection (such as a projection 40 at the first central end 24 of the forward-bottom portion 20) that is received in a recess (such as a recess 42 at the second central end 26 of the rear-top portion 22) that effectuates such alignment and connection of the channel sections 36 and 38 to one another. The projection 40 and recess 42 could be tapered such that, as the portions 20 and 22 are brought together, this causes an air-tight connection and/or sealed connection between the two portions 20 and 22 to prevent water in the channel 28 from entering the connection interface between the portions 20 and 22 as well as an internal cavity 46 therebetween that can be used to create buoyancy, which internal cavity 46 is now further described.

The internal cavity 46 can be formed in a volume between the first central end 24 of the forward-bottom portion 20 and the second central end 26 of the rear-top portion 22. This internal cavity 46 can simply be a volume or gap between the two portions 20 and 22 that is air-tight and closed such that water cannot enter the internal cavity 46 from either the channel 28 (and, more specifically, from the interface at the channel sections 36 and 38) as well as from an outer surface of the bobber 10 where the portions 20 and 22 are also joined together. In order to effectuate this seal, there could be seals or o-rings, but the material of the portions 20 and 22 themselves may be sufficiently compliant to create a good seal and/or the method of connection (i.e., adhesive, spin welding, and so forth) may result in a substantially water-tight seal in these locations.

The internal cavity 46 can provide an internal volume of air or gas to help provide the desired buoyancy of the bobber 10 in water and, moreover can offer such buoyancy in a way so as to offset any uneven weight distribution created by the weight ballast. Still further, the internal cavity 46 can be so positioned and structured to facilitate the horizontal at rest, and vertical upon bite behavior desired during use as illustrated in FIGS. 4 and 5, respectively, and described above.

Additionally, the internal cavity 46 can provide an internal echo sound chamber for attracting fish. When the bobber 10 is in a horizontal position as illustrated in FIG. 4, the rod (not shown) providing the fishing line 34 can be slightly lifted and dropped to create a slight slapping upon the water. In so doing this, the sound may echo in the internal cavity 46, which may help to attract or interest fish.

With reference being made to FIGS. 1 through 3, the forward-bottom axial end 14 and forward-bottom portion 20 provides a base wall 48. This base wall 48 is a wide and flat forward-facing surface of the slip bobber 10. On the base wall 48, there is a protruding ring 50 about the forward-bottom line opening 30 and, at the rearmost end of the tail, there is a protruding ring 52 about the rear-top line opening 32. These protruding rings 50 and 52 can be unitarily formed with the respective portions 20 and 22 and about the forward-bottom line opening 30 and the rear-top line opening 32, respectively, and simulate grommets without requiring actual grommets and the assembly steps associated therewith in construction of the bobber 10.

The base wall 48 is for pushing an attached bait forward during casting while avoiding line tangle, particularly in combination with the full-length channel 28 (as opposed to a J-hook mechanism as in some pre-existing bobbers). For example and with reference to FIG. 3, during casting, the forward-bottom portion 20 will lead as the bobber travels through the air and the fishing line 34 will tend to get pulled out the rear side of the bobber 10. This continues until the sinker bead 54 and hook 56 get pulled to forward-bottom line opening 30 at the protruding ring 50 and the sinker bead 54 prevents the further pulling of the line 34 through the channel 28. Two things prevent and minimize line tangle in this arrangement as compared to a J-hook mechanisms on one of the ends of a similarly shaped bobber. First, because the line openings 30 and 32 of the channel 28 are spaced from one another, there is less likelihood of the line 34 twisting onto itself than if the line was just passed through a closing ring as in a J-hook mechanism. To this end, it is contemplated that a length of the slip bobber 10 between the forward-bottom line opening 30 and the rear-top line opening 32 could be at least, two, at least three, or at least four times as long as a maximum width of the slip bobber 10 in a direction perpendicular to the length. Although the width is not necessarily correlated to the length, it may be valuable for the channel 28 to have appreciable length to achieve the aforementioned purpose, meaning the bobber 10 is likely generally elongated. Second, the base wall 48 can push the hook 56 and any bait attached to the hook 56 forward and, even if the hook 56 angles back during the casting as depicted in FIG. 3, the hook 56 is prevented from engaging the exposed part of the line 34 at the other rear-top axial opening 32 during the cast.

With the structure and some of the function of the slip bobber 10 now having been described, the method of use will be described in a more fulsome manner. In the general method of use, the fishing line 34 is run through the full-length channel 28 of the slip bobber 10 with a free end of the fishing line 34 (that is, the end to which the hook 56 and sinker bead 54 will eventually be attached) being inserted into the rear-top line opening 32 and subsequently exiting the forward-bottom line opening 30. At this point, with the fishing line 34 through the channel 28, the hook 56 is attached on the free end of the fishing line 34 that has exited the forward bottom line opening. Proximate the hook 56, the sinker bead 54 or sink weight can also be attached. On the opposite end of the bobber 10 from the hook 56, a depth stop 58 is attached to the fishing line 34 for selective engagement with the rear-top line opening 32 on a side of the slip bobber 10 opposite the hook 56 in order to set a depth of the hook 56 and any associated bait during fishing.

With this setup and as previously mentioned, when the hook 56 is baited and the line 34 is cast, the forward-bottom portion 20 of the bobber 10 will lead during the cast. The line 34 will tend to be pulled back through the rear-top line opening 32, as the bobber 10 will weigh more than the other items attached to the line 34 and advance faster during the cast, until the sinker bead 54 prevents the further travel of the line 34 back through the channel 28 and the bobber 10 (along with the sinker bead 54 and hook 56) pull the line 34 forward during the cast. Even in the case that there is some additional length of the line 34 between the sinker bead 54 and the hook 56 relative to the amount illustrated in FIG. 3, the distance between the line openings 30 and 32 and the fact that the base wall 48 will push the hook 56 and bait forward will tend to reduce line tangle from occurring (especially when compared to the use of a J-hook mechanisms).

When the bobber 10 lands in the water, the bobber 10 will lay horizontal as generally depicted in FIG. 4. The weight of the sinker bead 54, hook 56, and bait (not shown), will pull the line 34 through the channel 28 and out of the forward-bottom line opening 30. The sinker bead 54, hook 56, and bait will continue to drop in the water until the depth stop 58 contacts the rear-top line opening 32 as depicted in FIG. 4. At this point, the depth of the hook 56 and bait is established. It can be readily appreciated that the spacing between the depth stop 58 and the sinker bead 54, hook 56, and bait will establish the depth and so, the greater the distance between the depth stop 58 and the sinker bead 54, the greater the resultant deployment depth. It will be appreciated that other beads and stops could be employ in addition to those depicted. For example, there could be an additional bead on either or both sides of the line 34.

When a fish bite occurs as depicted in FIG. 5, the line 34 will be pulled, which will cause the slip bobber to go from the horizontal orientation depicted in FIG. 4 relative to the water W, to a more vertical orientation as depicted in FIG. 5. The new orientation will provide a bite indication (as well as some tension on the line 34) and line 34 can then be reeled in to retrieve the catch.

Those skilled in the art will now see that certain modifications can be made to the claimed invention without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. A slip bobber comprising:
a bobber body extending along a central longitudinal axis, the bobber body including a forward-bottom portion and a rear-top portion;
a forward-bottom line opening at a forward-bottom axial end of the forward-bottom portion;
a rear-top line opening at a rear-top axial end of the rear-top portion;
a full-length channel running from the forward-bottom line opening to the rear-top line opening extending axially through the bobber body along the central longitudinal axis in which the full-length channel is for accommodating the reception of a fishing line therethrough;
wherein the bobber body has a weight ballast located between the forward-bottom line opening and rear-top line opening that results in a center of gravity of the bobber body being closer to the forward-bottom line opening than the rear-top line opening such that, upon casting, the weight ballast causes the forward-bottom portion of the bobber body to lead and the rear-top portion to trail; and
wherein, upon reception in water, the weight ballast of the bobber body is so situated such that the bobber body and the full-length channel lies horizontal in the water in a rest position with the central longitudinal axis and the full-length channel being substantially parallel to a surface of the water in which the slip bobber is received.

2. The slip bobber of claim 1, wherein upon reception in the water and upon a downward force being applied at the forward-bottom line opening, the weight ballast is so situated as to cause the forward-bottom portion of the bobber body to tip down into the water further and the rear-top portion of the bobber body to tip up out of the water such that the slip bobber assumes a bite indication position.

3. The slip bobber of claim 2, wherein, in the bite indication position of the slip bobber the central longitudinal axis of the of the bobber body is substantially perpendicular to a surface of the water.

4. The slip bobber of claim 1, wherein the forward-bottom portion and the rear-top portion are separately formed parts of the bobber body that are joined together in which:
the forward-bottom portion includes the forward-bottom axial end and a first central end in which the forward-bottom portion includes a forward-bottom channel section; and
the rear-top portion includes the rear-top axial end and a second central end in which the rear-top portion includes a rear-top channel section; and
the first central end of the forward-bottom portion is joined to the second central end of the rearward-top portion, thereby aligning and connecting the forward-bottom channel section and the rear-top channel section to provide the full-length channel section that extends along the central longitudinal axis.

5. The slip bobber of claim 4, wherein the forward-bottom portion is heavier than the rear-top portion.

6. The slip bobber of claim 4, wherein the forward-bottom portion has a higher density than the rear-top portion.

7. The slip bobber of claim 4, wherein the forward-bottom portion and the rear-top portion are joined together by at least one of sonic welding, spin welding, and gluing.

8. The slip bobber of claim 4, further comprising an internal cavity formed in a volume between the first central end of the forward-bottom portion and the second central end of the rear-top portion.

9. The slip bobber of claim 8, wherein the internal cavity provides an internal echo sound chamber for attracting fish.

10. The slip bobber of claim 1, wherein the forward-bottom axial end provides a base wall for pushing an attached bait forward during casting while avoiding line tangle.

11. The slip bobber of claim 1, wherein the forward-bottom axial end of the forward-bottom portion and the rear-top axial end of the rear-top portion have protruding rings unitarily formed about the forward-bottom line opening and the rear-top line opening respectively that simulate grommets without requiring actual grommets and assembly steps associated therewith.

12. The slip bobber of claim 1, wherein a length of the slip bobber between the forward-bottom line opening and the rear-top line opening is at least three times as long as a maximum width of the slip bobber in a direction perpendicular to the length.

13. A method of using the slip bobber of claim 1, comprising the steps of:
running a fishing line through the full-length channel of the slip bobber with a free end of the fishing line being inserted into the rear-top line-opening and exiting the forward-bottom line opening;
attaching a hook on the free end of the fishing line that has exited the forward bottom line opening.

14. The method of claim 13, further comprising the step of attaching a sink weight to the fishing line between the hook and the full-length channel.

15. The method of claim 14, further comprising the step of attaching a depth stop to the fishing line for selective engagement with the rear-top line opening on a side of the slip bobber opposite the hook to set a depth of the hook and any associated bait during fishing.

16. The slip bobber of claim 1, wherein the forward-bottom portion is heavier than the rear-top portion with the forward-bottom portion and has more material than the rear-top portion.

17. The slip bobber of claim 1, wherein the bobber body includes only the forward-bottom portion and the rear-top portion and thereby has a two-piece construction.

18. A slip bobber comprising:
a bobber body extending along a central longitudinal axis, the bobber body includes only a forward-bottom portion and a rear-top portion and thereby has a two-piece construction;
a forward-bottom line opening at a forward-bottom axial end of the forward-bottom portion;
a rear-top line opening at a rear-top axial end of the rear-top portion;
a full-length channel running from the forward-bottom line opening to the rear-top line opening extending axially through the bobber body along the central longitudinal axis in which the full-length channel is for accommodating the reception of a fishing line therethrough;

wherein the bobber body has a weight ballast located between the forward-bottom line opening and rear-top line opening, with the forward-bottom portion of the bobber body is heavier than the rear-top portion of the bobber body, that results in a center of gravity of the bobber body being closer to the forward-bottom line opening than the rear-top line opening such that, upon casting, the weight ballast causes the forward-bottom portion of the bobber body to lead and the rear-top portion to trail;

wherein, upon reception in water, the weight ballast of the bobber body is so situated such that the bobber body and the full-length channel lies horizontal in the water in a rest position with the central longitudinal axis and the full-length channel being substantially parallel to a surface of the water in which the slip bobber is received; and wherein, upon reception in the water and upon a downward force being applied at the forward-bottom line opening, the weight ballast is so situated as to cause the forward-bottom portion of the bobber body to tip down into the water further and the rear-top portion of the bobber body to tip up out of the water such that the slip bobber assumes a bite indication position in which the central longitudinal axis of the of the bobber body and the full-length channel is substantially perpendicular to the surface of the water.

19. The slip bobber of claim 18, wherein an internal cavity provides an internal echo sound chamber for attracting fish; and wherein a length of the slip bobber between the forward-bottom line opening and the rear-top line opening is at least three times as long as a maximum width of the slip bobber in a direction perpendicular to the length.

20. The slip bobber of claim 19, wherein the forward-bottom axial end of the forward-bottom portion and the rear-top axial end of the rear-top portion have protruding rings unitarily formed about the forward-bottom line opening and the rear-top line opening respectively that simulate grommets without requiring actual grommets and assembly steps associated therewith.

\* \* \* \* \*